(12) United States Patent
Facchinello et al.

(10) Patent No.: US 10,406,900 B2
(45) Date of Patent: Sep. 10, 2019

(54) TONNEAU COVER SYSTEM WITH INTEGRAL SIDE RAIL CLAMP

(71) Applicant: Extang Corporation, Ann Arbor, MI (US)

(72) Inventors: Jerome J. Facchinello, Grand Blanc, MI (US); Ryan W. Delong, Stockbridge, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 0 days.

(21) Appl. No.: 15/654,570

(22) Filed: Jul. 19, 2017

(65) Prior Publication Data

US 2018/0118008 A1 May 3, 2018

Related U.S. Application Data

(63) Continuation-in-part of application No. 15/355,339, filed on Nov. 18, 2016, now Pat. No. 9,764,628, and a continuation-in-part of application No. 15/336,092, filed on Oct. 27, 2016, now Pat. No. 10,023,035.

(51) Int. Cl.
*B60P 7/02* (2006.01)
*B60J 7/19* (2006.01)
*B60J 7/14* (2006.01)

(52) U.S. Cl.
CPC .............. *B60J 7/198* (2013.01); *B60J 7/141* (2013.01)

(58) Field of Classification Search
CPC ... B60J 7/102; B60J 7/104; B60J 7/141; B60J 7/198; B60P 7/04; B60P 7/02; B62D 33/0273

USPC .................................................. 296/100.07
See application file for complete search history.

(56) References Cited

U.S. PATENT DOCUMENTS

| | | | | |
|---|---|---|---|---|
| 4,730,866 A | * | 3/1988 | Nett | B60J 7/104 296/100.18 |
| 5,018,777 A | | 5/1991 | Swenson | |
| 5,174,353 A | * | 12/1992 | Schmeichel | B60J 7/104 160/328 |
| 5,228,739 A | * | 7/1993 | Love | F16B 2/065 248/229.24 |
| 5,275,458 A | * | 1/1994 | Barben | B60J 7/104 160/379 |
| 5,301,913 A | * | 4/1994 | Wheatley | B60R 9/00 248/231.41 |
| 5,310,238 A | * | 5/1994 | Wheatley | B60J 7/104 296/100.18 |

(Continued)

*Primary Examiner* — Kiran B Patel
(74) *Attorney, Agent, or Firm* — Harness, Dickey & Pierce, P.L.C.

(57) ABSTRACT

A tonneau cover system for a pickup truck cargo box comprising a tonneau cover sized and shaped for covering the cargo box. A side rail comprises a first clamping surface adapted to engage the first side of the downward flange. A rod has a rod axis and is mounted on the side rail. A clamp body is mounted on the rod and includes a clamp arm having a second clamping surface adapted to engage the second side of the side rail. A cam is included with one of the side rail and the clamp body. A cam follower engages with the cam. The cam follower is included with the other one of the side rail and the clamp body. Movement of the clamp body along the axis of the rod advances the cam follower along the cam to thereby move the first clamping surface toward the downward flange.

7 Claims, 8 Drawing Sheets

(56) References Cited

U.S. PATENT DOCUMENTS

| | | | |
|---|---|---|---|
| 5,460,423 A | 10/1995 | Kersting et al. | |
| 5,487,585 A * | 1/1996 | Wheatley | B60J 7/104 160/368.1 |
| 5,540,475 A * | 7/1996 | Kersting | B60J 7/185 224/331 |
| 5,636,893 A * | 6/1997 | Wheatley | B60J 7/141 16/354 |
| 5,655,808 A * | 8/1997 | Wheatley | B60P 7/0815 248/227.1 |
| 5,688,017 A * | 11/1997 | Bennett | B60J 7/08 296/100.17 |
| 5,788,315 A * | 8/1998 | Tucker | B60J 7/102 160/395 |
| 5,860,691 A * | 1/1999 | Thomsen | B60J 7/08 296/100.18 |
| 5,931,176 A * | 8/1999 | Isler | E04H 15/06 135/88.13 |
| 6,024,401 A * | 2/2000 | Wheatley | B60J 7/102 296/100.17 |
| 6,024,402 A * | 2/2000 | Wheatley | B60J 7/102 224/403 |
| 6,076,881 A * | 6/2000 | Tucker | B60J 7/141 296/100.07 |
| 6,183,035 B1 * | 2/2001 | Rusu | B60J 7/1621 296/100.01 |
| 6,257,647 B1 * | 7/2001 | Ninness | B60J 7/102 160/290.1 |
| 6,340,194 B1 * | 1/2002 | Muirhead | B60J 7/1621 296/100.01 |
| 6,712,418 B1 * | 3/2004 | Lathers | B60J 7/1614 296/100.02 |
| 6,752,449 B1 * | 6/2004 | Wheatley | B60J 7/102 296/100.17 |
| 7,093,811 B2 | 8/2006 | Wu | |
| 7,188,888 B2 | 3/2007 | Wheatley et al. | |
| 7,252,322 B2 * | 8/2007 | Rusu | B60J 7/1621 296/100.07 |
| 7,258,387 B2 | 8/2007 | Weldy | |
| 7,628,442 B1 | 12/2009 | Spencer et al. | |
| 7,815,239 B1 * | 10/2010 | Schmeichel | B60J 11/00 296/136.01 |
| 8,807,625 B2 | 8/2014 | Garska | |
| 8,857,887 B1 * | 10/2014 | Schmeichel | B60P 7/04 296/100.18 |
| 8,960,764 B2 | 2/2015 | Spencer | |
| 9,849,765 B2 * | 12/2017 | Carlson | B60J 7/1607 |
| 9,868,342 B2 * | 1/2018 | Xu | B60J 7/085 |
| 2002/0096268 A1 * | 7/2002 | Schmeichel | B60J 7/102 160/328 |
| 2002/0180235 A1 * | 12/2002 | Wheatley | B60J 7/102 296/100.16 |
| 2003/0057726 A1 * | 3/2003 | Wheatley | B60J 7/102 296/100.18 |
| 2004/0124658 A1 * | 7/2004 | Wheatley | B60J 7/102 296/98 |
| 2004/0245799 A1 * | 12/2004 | Rusu | B62D 25/10 296/100.06 |
| 2005/0146158 A1 * | 7/2005 | Schmeichel | B60J 7/102 296/100.16 |
| 2007/0110539 A1 * | 5/2007 | Klinkman | B60P 7/0815 410/150 |
| 2008/0143133 A1 * | 6/2008 | Nichols | B60P 7/0815 296/3 |
| 2008/0179911 A1 * | 7/2008 | Spencer | B60J 7/085 296/100.17 |
| 2012/0274092 A1 | 11/2012 | Yue | |
| 2012/0274093 A1 * | 11/2012 | Yue | B60J 7/102 296/100.16 |
| 2013/0001979 A1 * | 1/2013 | Rusher | B60J 7/141 296/100.07 |
| 2013/0341960 A1 * | 12/2013 | Garska | B23P 11/00 296/100.18 |
| 2014/0042754 A1 | 2/2014 | Spencer | |
| 2015/0130212 A1 | 5/2015 | Spencer | |
| 2016/0039274 A1 | 2/2016 | Smith | |
| 2016/0096421 A1 * | 4/2016 | Facchinello | B60J 7/106 292/256 |
| 2016/0114666 A1 | 4/2016 | Xu | |
| 2016/0280123 A1 * | 9/2016 | Rohr | B60J 7/068 |
| 2017/0066311 A1 * | 3/2017 | Facchinello | B60J 7/198 |
| 2017/0144520 A1 * | 5/2017 | Hemphill | B60R 13/01 |
| 2017/0144521 A1 * | 5/2017 | Carlson | B60J 7/102 |
| 2017/0174119 A1 * | 6/2017 | Hemphill | B60P 7/0815 |
| 2017/0197498 A1 * | 7/2017 | Facchinello | B60J 7/198 |
| 2017/0240033 A1 * | 8/2017 | Dylewski, II | B60J 7/141 |
| 2017/0259655 A1 * | 9/2017 | Dylewski, II | B60J 7/141 |
| 2017/0297474 A1 * | 10/2017 | Hemphill | B60P 7/0815 |

* cited by examiner

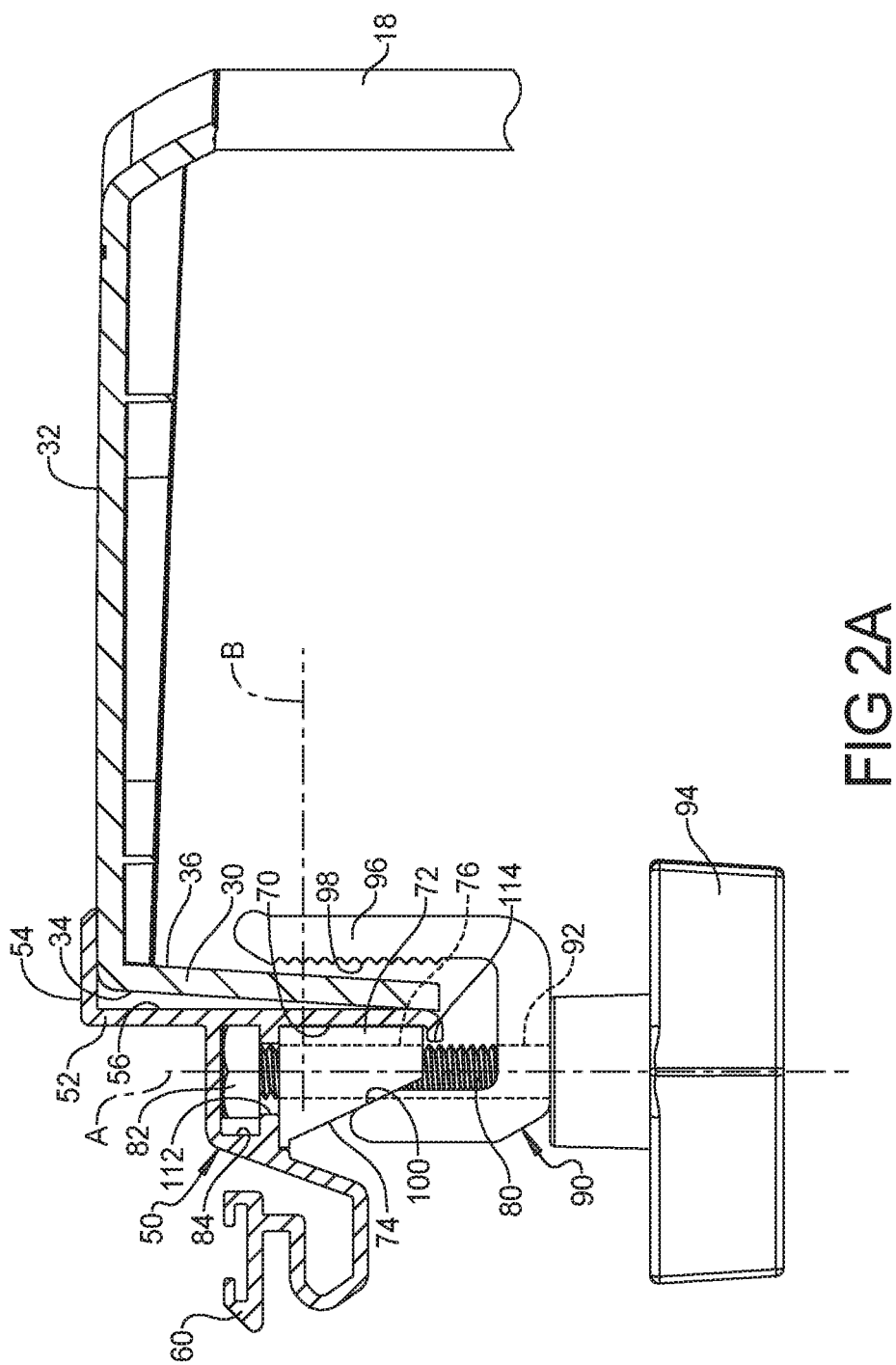

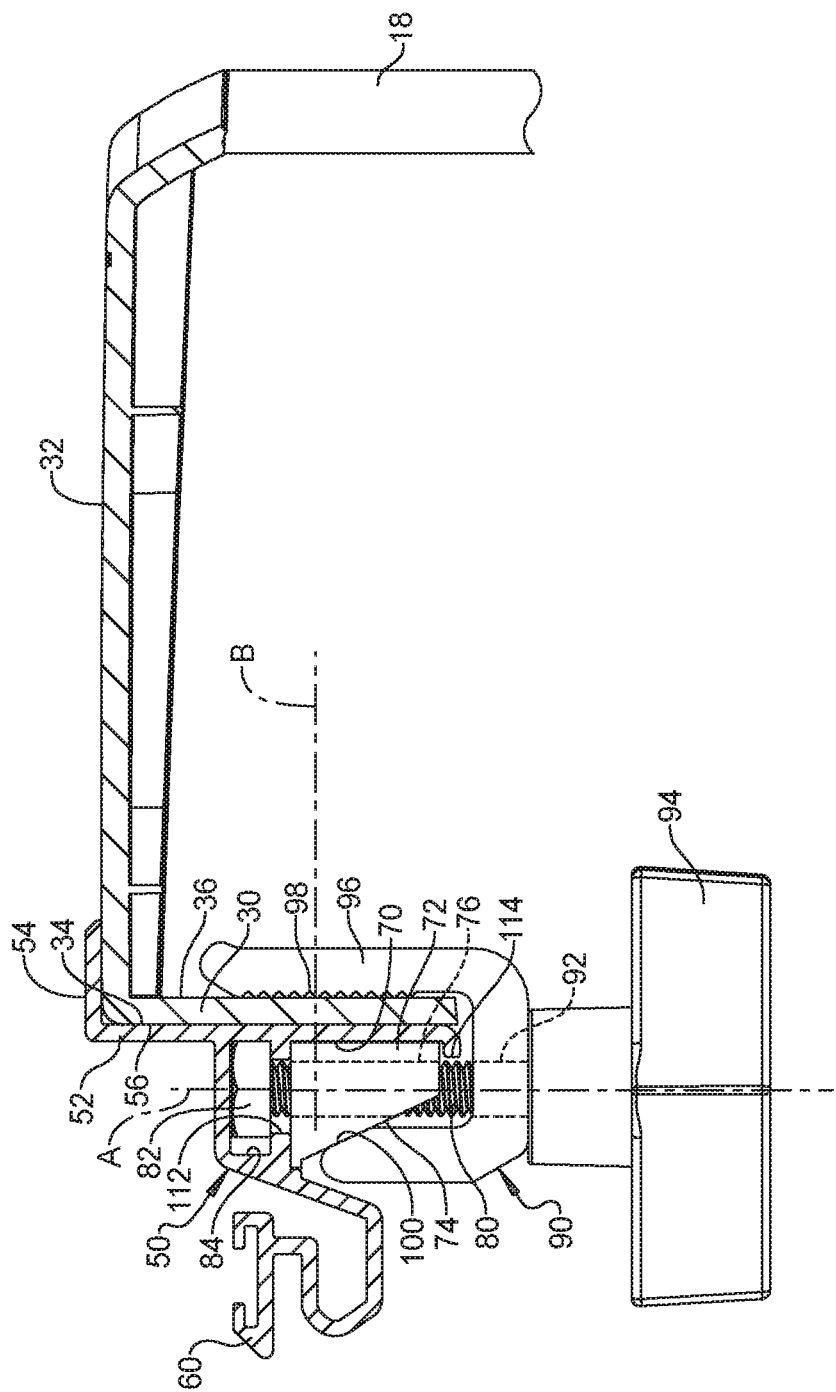

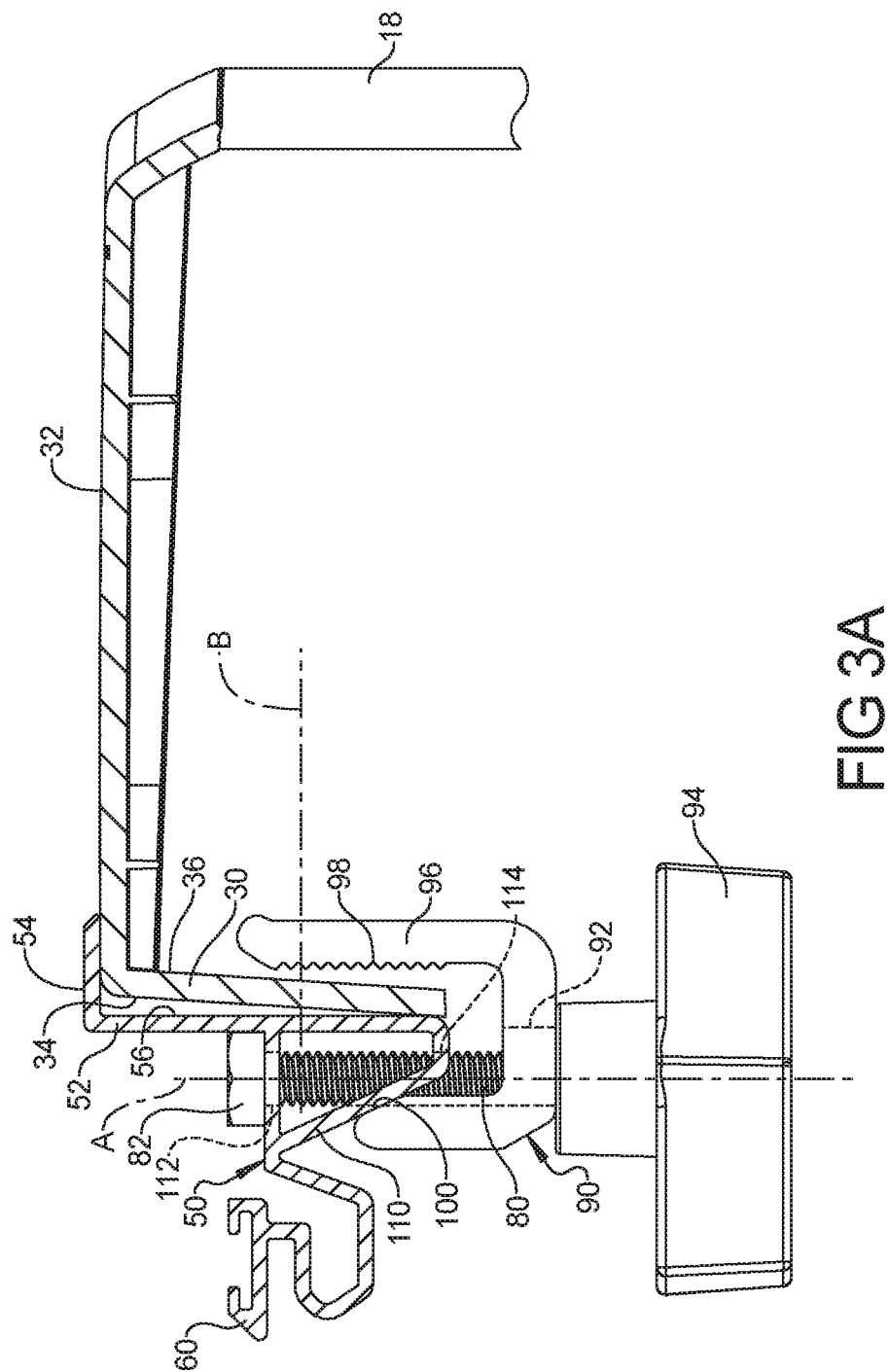

TONNEAU COVER SYSTEM WITH INTEGRAL SIDE RAIL CLAMP

CROSS-REFERENCE TO RELATED APPLICATIONS

This application is a continuation-in-part of U.S. patent application Ser. No. 15/336,092 filed Oct. 27, 2016, and U.S. patent application Ser. No. 15/355,339 filed Nov. 18, 2016. The entire disclosures of each of these patent applications are incorporated herein by reference.

FIELD

The present disclosure relates to a tonneau cover system with an integral side rail clamp.

BACKGROUND

This section provides background information related to the present disclosure, which is not necessarily prior art.

Tonneau cover bed rails are typically attached to sidewalls extending a length of a pickup truck box or cargo bed with two clamp bodies and a threaded fastener, which secures the clamp bodies together and applies a clamping pressure. This requires hand tools to tighten the system together. While current clamp bodies are suitable for their intended use, they are subject to improvement. For example, an improved tonneau cover system that is easier to install and reduces risk of damage to the cargo bed sidewall would be desirable. The present teachings provide such advantages, as well as numerous others.

SUMMARY

This section provides a general summary of the disclosure, and is not a comprehensive disclosure of its full scope or all of its features.

The present teachings provide for a tonneau cover system for a cargo box of a pickup truck. The cargo box comprises a side wall including a downward flange having a first side facing the cargo box and a second side opposite to the first side. The tonneau cover system comprises a tonneau cover sized and shaped for covering the cargo box. A side rail is mountable to the side wall to support the cover. The side rail comprises a first clamping surface adapted to engage the first side of the downward flange. A rod has a rod axis and is mounted on the side rail. A clamp body is mounted on the rod and includes a clamp arm having a second clamping surface. A cam is included with one of the side rail and the clamp body. A cam follower engages with the cam. The cam follower is included with the other one of the side rail and the clamp body. Movement of the clamp body along the axis of the rod advances the cam follower along the cam to thereby move the first clamping surface toward the downward flange.

The present teachings provide for another tonneau cover system for a cargo box of a pickup truck. The cargo box comprises a side wall including a downward flange having a first side facing the cargo box and a second side opposite to the first side. The tonneau cover system comprises a tonneau cover sized and shaped for covering the cargo box. A side rail is mountable to the side wall to support the cover. The side rail comprises a first clamping surface adapted to engage the first side of the side wall. A ramp surface is opposite the first clamping surface of the side rail. A rod has a rod axis and is mounted on the side rail. A clamp body is mounted on the rod and includes a clamp arm having a second clamping surface, and a contact for engaging the ramp surface. Movement of the clamp body along the rod axis and towards the side rail advances the contact along the ramp surface to thereby move the second clamping surface towards the downward flange.

The present teachings provide for another tonneau cover system for a cargo box of a pickup truck. The cargo box comprises a side wall including a downward flange having a first side facing the cargo box and a second side opposite to the first side. The tonneau cover system comprises a tonneau cover sized and shaped for covering the cargo box. A side rail is mountable to the side wall to support the cover. The side rail comprises a first clamping surface adapted to engage the first side of the downward flange. A rod has a rod axis and is mounted on the side rail. A clamp body is mounted on the rod and includes a clamp arm having a second clamping surface adapted to engage the second side of the side rail, and a third clamping surface adapted to engage an undersurface of a ledge of the sidewall. A cam is included with one of the side rail and the clamp body. A cam follower engages with the cam. The cam follower is included with the other one of the side rail and the clamp body. Movement of the clamp body along the axis of the rod advances the cam follower along the cam to thereby move the first clamping surface toward the second clamping surface, and move the third clamping surface towards the undersurface of the ledge to mount the side rail to the side wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 2A is a cross sectional view of the tonneau cover system according to the present teachings illustrating a side rail of the system against a downward flange of the pickup truck, and a clamp body of the system arranged in an unclamped position;

FIG. 2B illustrates the side rail of the tonneau cover system clamped to the flange by the clamp body, which has been moved to a clamped position from the unclamped position of FIG. 2A;

FIG. 3A illustrates another side rail according to the present teachings, the side rail positioned against the downward flange and the clamp body arranged in the unclamped position;

Corresponding reference numerals indicate corresponding parts throughout the several views of the drawings.

DETAILED DESCRIPTION

Example embodiments will now be described more fully with reference to the accompanying drawings.

Figure 1:
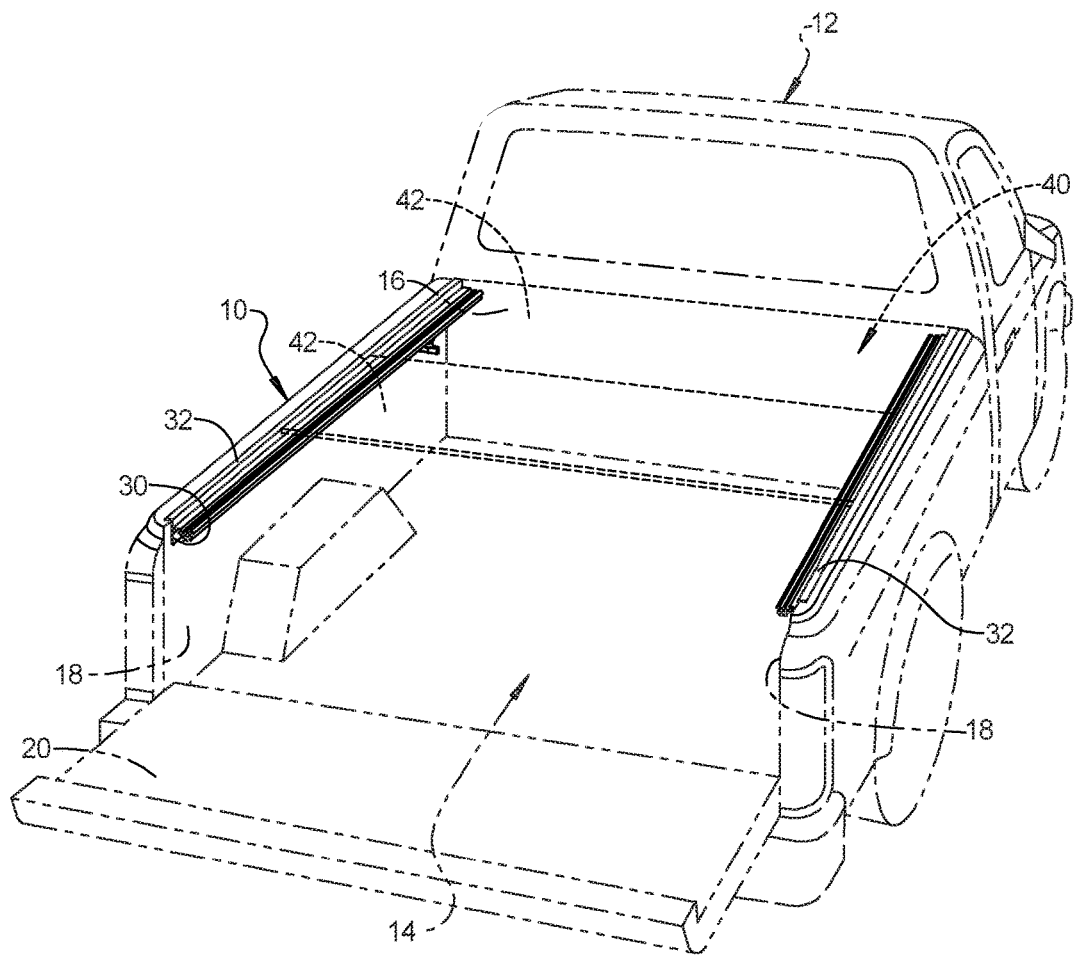
FIG. 1 illustrates a pickup truck including a tonneau cover system according to the present teachings.

FIG. 1 illustrates a tonneau cover system 10 according to the present teachings and a pickup truck 12. The pickup truck 12 includes a cargo box or cargo bed 14, which is generally defined by a front wall 16, a pair of longitudinal sidewalls 18, and a rear wall or tailgate 20. Extending along each of the sidewalls 18 is a downward flange 30 and a ledge 32. The ledges 32 each extend inward into the cargo box 14. Extending from each ledge 32 is a downward flange 30. With reference to FIG. 2A for example, each downward flange 30 includes a first or inboard side 34, which faces the cargo box 14, and a second side 36, which is opposite to the first side 34.

As illustrated in FIG. 1, the tonneau cover system 10 further includes a tonneau cover 40, which has a plurality of sections 42. Between each section 42 is a hinge, about which the tonneau cover 40 can be folded. More specifically, the sections 42 can pivot about the hinges to position the tonneau cover 40 in an extended position in which the sections 42 are each arranged in the same plane and extend the length of the cargo box 14 so as to cover the cargo box 14, and a partial or fully retracted position in which one or more of the sections 42 are stacked on top of one another so as to expose some or all of the cargo box 14. FIG. 1 generally illustrates the tonneau cover 40 in a partially retracted position.

With continued reference to FIG. 1, and additional reference to FIG. 2A (unclamped position) and FIG. 2B (clamped position), additional features of the tonneau cover system 10 will now be described, including a side rail 50, and a clamp body 90 for coupling the side rail 50 to the downward flange 30. The side rail 50 generally includes an elongated body 52 and a side rail flange or lip 54. The elongated body 52 extends along the length of the cargo box 14 adjacent to the downward flange 30, and extends vertically generally parallel to the sidewalls 18. The elongated body 52 includes a first clamping surface 56, which in the clamped position contacts the first side 34 of the downward flange 30. The side rail flange 54 extends from an upper end of the elongated body 52. The side rail flange 54 is seated on top of the ledge 32 in the clamped position. The side rail 50 further includes a ledge 60, which supports the sections 42 of the tonneau cover 40 when the tonneau cover 40 is arranged in the extended position, or the partially extended position.

The side rail 50 as configured in FIGS. 2A and 2B defines a first channel, or ramp channel, 70. Seated within the first channel 70 is a ramp body 72, which includes a cam or ramp surface 74. The ramp body 72 can be seated within the first channel 70 in any suitable manner, such as by sliding the ramp body 72 into the first channel 70 at either end of the side rail 50. The first channel 70 can extend along an entirety of, or less than an entirety of, the side rail 50. The cam or ramp surface 74 is opposite to the first clamping surface 56 of the side rail 50. Although the cam or ramp surface 74 is illustrated as part of the ramp body 72 and the cam follower or contact 100 is illustrated as part of the clamp body 90, this arrangement can be reversed such that the clamp body 90 includes a cam or ramp surface, and the ramp body 72 includes the cam follower or contact 100.

The ramp body 72 defines an aperture 76 extending therethrough. The rod 80 extends along a rod axis A through the aperture 76. The rod 80 is integral with, and extends from, a rod head 82, which is seated in a second channel (or rod head channel) 84 defined by the side rail 50. The rod head 82 can include a plurality of planar surfaces, one or more of which contacts an inner surface of the second channel 84 to prevent the rod head 82 and the rod 80 from rotating. The ramp body 72 can be slid into the first channel 70 with the rod 80 seated within the aperture 76, and thus the rod head 82 can be slid into the second channel 84 as the ramp body 72 is slid within the first channel 70.

The clamp body 90 defines an aperture 92 through which the rod 80 extends. A portion of the rod 80 extends out from within the aperture 92 into cooperation with an actuation member 94. The rod 80 can be threaded such that rotation of the actuation member 94 in a first direction will move the actuation member 94 along the rod 80 towards the rod head 82, and rotation of the actuation member 94 in a second direction opposite to the first direction will move the actuation member 94 along the rod 80 away from the rod head 82.

The clamp body 90 further includes a clamp arm 96, which has a second clamping surface 98. The second clamping surface 98 is arranged opposite to the second side 36 of the downward flange 30. The clamp body 90 further includes a cam follower, or contact, 100. The cam follower 100 abuts the cam 74.

Rotation of the actuation member 94 in the first direction moves the actuation member 94 along the rod 80 towards the rod head 82, which moves the clamp body 90 along the rod axis A and advances the cam follower 100 along the cam 74 to thereby move the elongated body 52 and the clamp arm 96 together. As the elongated body 52 and the clamp arm 96 move together, the first and second clamping surfaces 56 and 98 thereof move towards one another, such as along an axis B perpendicular to the axis A. The downward flange 30 is between the first clamping surface 56 and the second clamping surface 98, and thus at least a portion of the first clamping surface 56 abuts the first side 34 of the downward flange 30, and the second clamping surface 98 abuts the second side 36 of the downward flange 30, to thereby secure the side rail 50 to the downward flange 30. The tonneau cover system 10 can include any suitable number of clamp bodies 90 along the length of each one of the side rails 50. For example, each one of the side rails 50 can be secured to one of the downward flanges 30 with two clamp bodies 90.

Rotation of the actuation member 94 in the second direction, which is opposite to the first direction, moves the clamp body 90 to the unclamped position. Specifically, rotation of the actuation member 94 in the second direction moves the actuation member 94 along the rod 80 away from the rod head 82, which moves the clamp body 90 along the rod axis A and advances the cam follower 100 along the cam 74 to thereby move the elongated body 52 and the clamp arm 96 apart. As the elongated body 52 and the clamp arm 96 move apart, the first and second clamping surfaces 56 and 98 thereof move away from one another, such as along axis B perpendicular to the axis A.

Figure 2C:
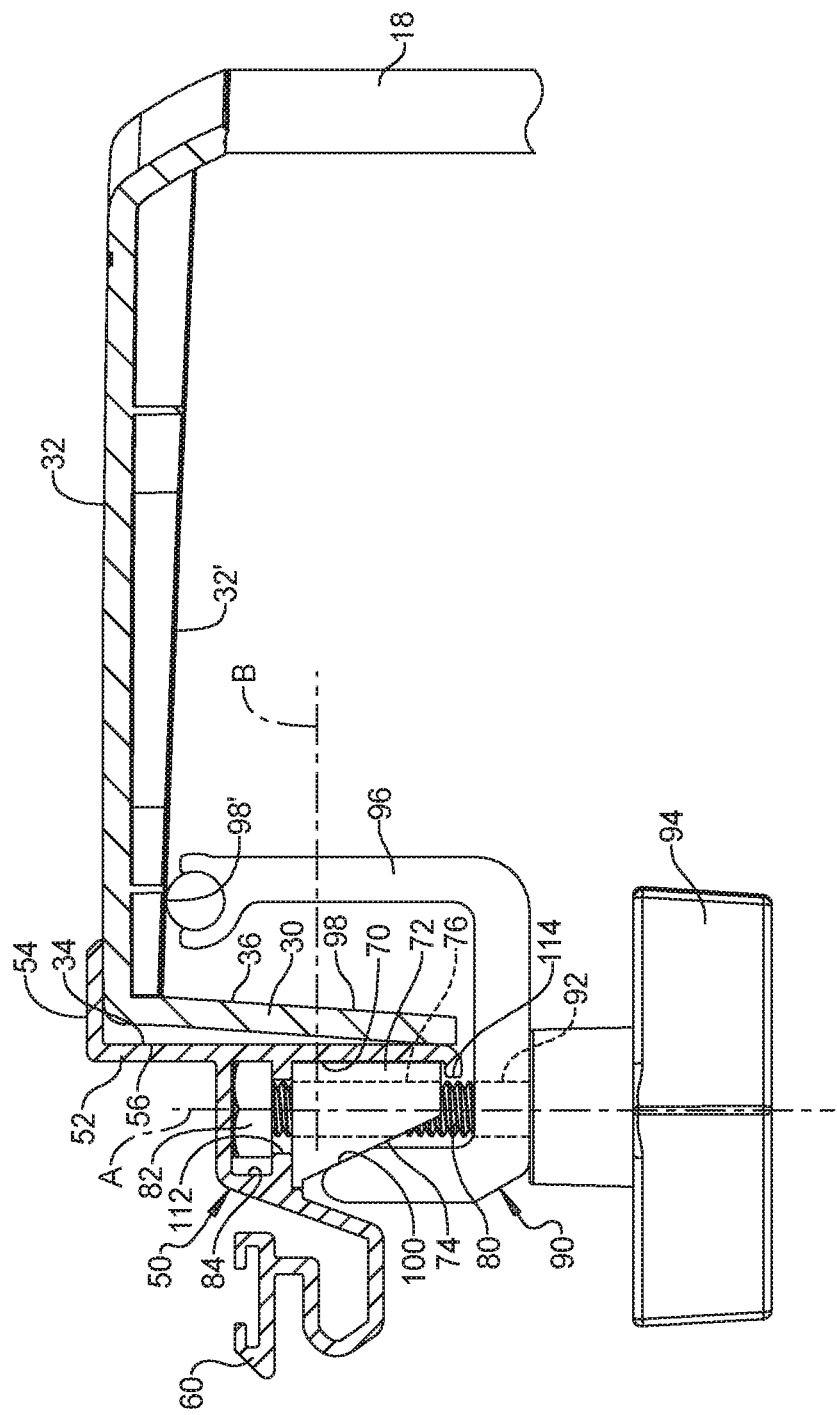
FIG. 2C illustrates an additional side rail according to the present teachings, the side rail positioned against the downward flange and the clamp body arranged in a clamped position.

With reference to FIG. 2C, the clamp arm 96 can be elongated and extended further away from the downward flange 30. As a result, the second clamping surface is at a distal end of the clamp arm 96, and is designated at reference numeral 98'. In the clamped position of FIG. 2C, the second clamping surface 98' advantageously contacts undersurface 32' of the ledge 32 instead of the downward flange 30. As a result, clamping force that may damage or distort the downward flange 30 is reduced or eliminated. To further reduce the possibility of any damage or distortion to the downward flange 30, the second clamping surface 98' may include a flexible member as illustrated, such as a polymeric member, attached to the clamp body 90 in any suitable manner.

Figure 3B:
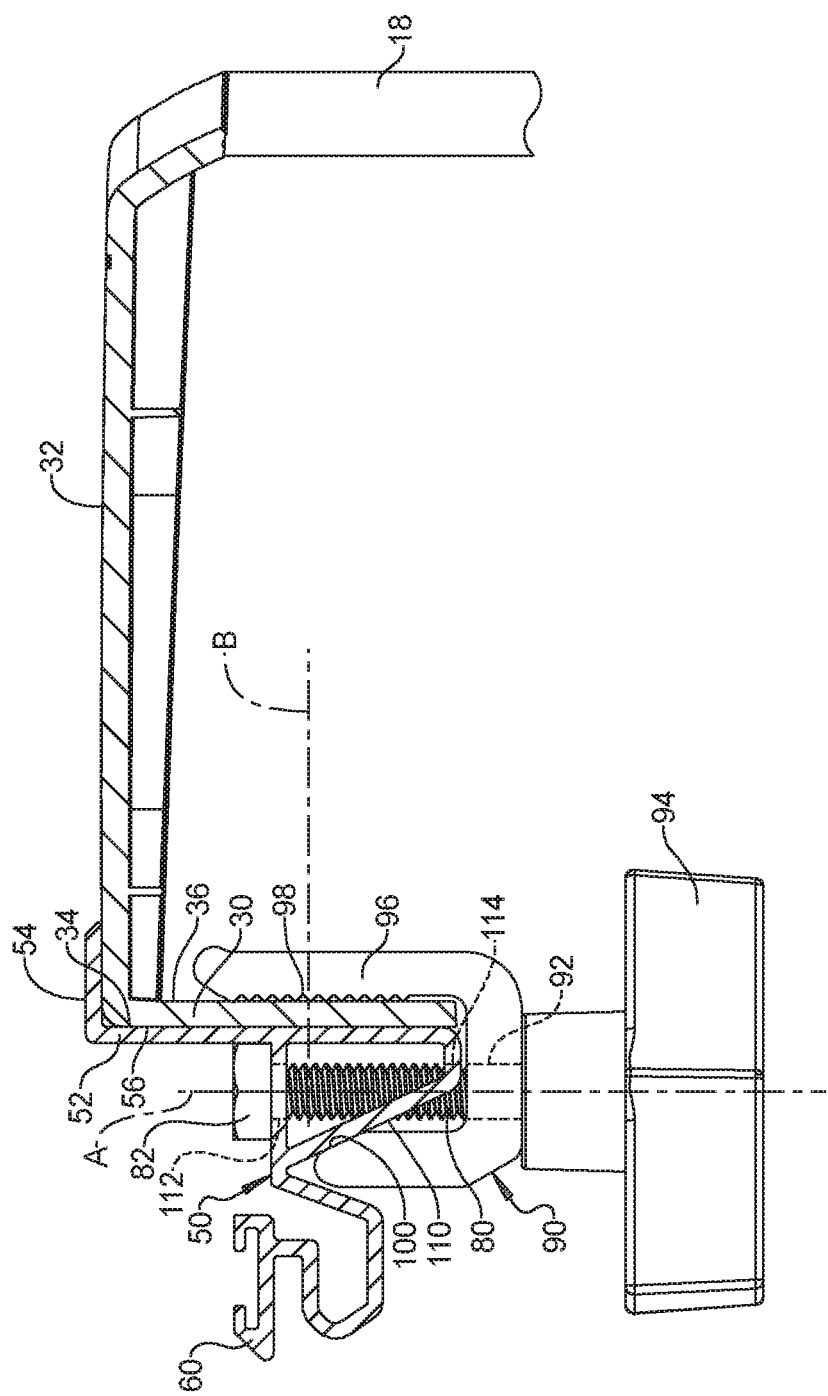
FIG. 3B illustrates the side rail of FIG. 3A clamped to the flange with the clamp body, which has been moved from the unclamped position of FIG. 3A to a clamped position.

With additional reference to FIGS. 3A and 3B, the side rail 50 can be configured with a cam or ramp surface 110 as part of the side rail 50, rather than as part of the ramp body 72 (which is a separate piece from the side rail 50) as is illustrated in FIGS. 2A and 2B. The cam or ramp surface 110 is opposite to the first clamping surface 56. Although the cam or ramp surface 110 is illustrated as part of the side rail 50 and the cam follower or contact 100 is illustrated as part of the clamp body 90, this configuration can be reversed such that the cam or ramp surface 110 is included with the clamp body 90, and the cam follower or contact 100 is included with the side rail 50. The side rail 50 can be made in any suitable manner. For example, the side rail 50 can be a one-piece extruded member with the cam or ramp surface 110 integral therewith.

In the configuration of FIGS. 3A and 3B, the side rail 50 defines an upper aperture 112 and a lower aperture 114. The rod 80 extends through both the upper aperture 112 and the lower aperture 114. The rod head 82 is seated on a side of the upper aperture 112 opposite to the cam or ramp surface 110. The rod head 82 is positioned such that a planar portion thereof is seated against the elongated body 52, which prevents the rod head 82 and the rod 80 from rotating.

FIG. 3A illustrates the clamp body 90 and the actuation member 94 in an unclamped position, and FIG. 3B illustrates the clamp body 90 and the actuation member 94 in a clamped position. Rotation of the actuation member 94 in the first direction moves the actuation member 94 along the rod axis A of the rod 80 towards the rod head 82. As the actuation member 94 moves towards the rod head 82, the cam follower or contact 100 moves along the cam or ramp surface 110, which thereby moves the first and second clamping surfaces 56 and 98 together, such as along axis B perpendicular to axis A, so that at least a portion of the first clamping surface 56 contacts the first side 34 of the downward flange 30, and the second clamping surface 98 of the clamp arm 96 contacts the second side 36 of the downward flange 30 in order to secure the side rail 50 to the downward flange 30.

To move the clamp body 90 and the actuation member 94 from the clamped position of FIG. 3B to the unclamped position of FIG. 3A, the actuation member 94 is rotated in the second direction opposite to the first direction, which moves the actuation member 94 along the rod axis A away from the rod head 82. As the actuation member 94 moves away from the rod head 82, the cam follower or contact 100 moves along the cam or ramp surface 110, which thereby moves the first and second clamping surfaces 56 and 98 apart, such as along axis B perpendicular to axis A, so that the first clamping surface 56 no longer contacts the first side 34 of the downward flange 30, and the second clamping surface 98 of the clamp arm 96 no longer contacts the second side 36 of the downward flange 30, thereby releasing the side rail 50 from the downward flange 30.

Figure 3C:
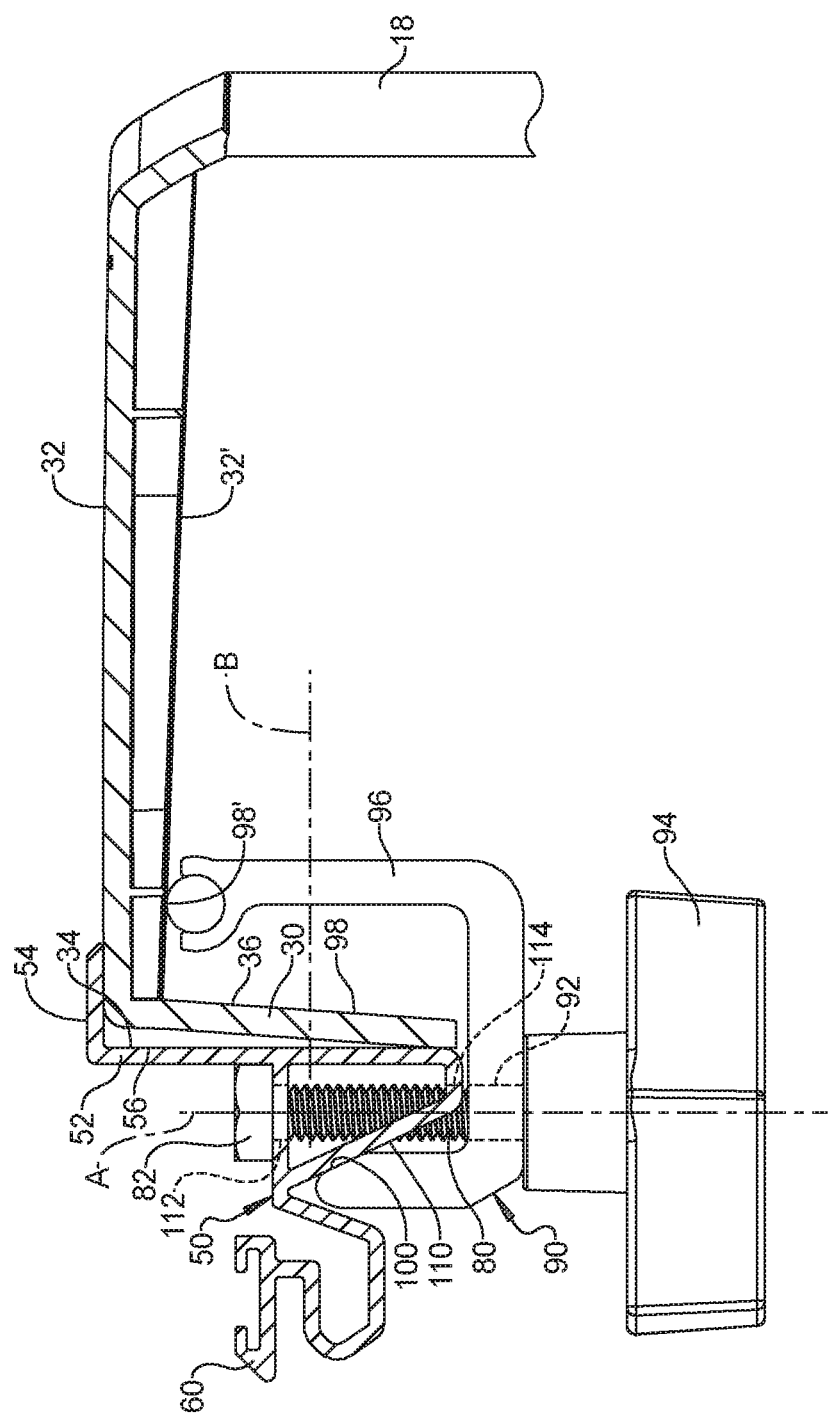
FIG. 3C illustrates an additional side rail according to the present teachings, the side rail positioned against the downward flange and the clamp body arranged in a clamped position.

With reference to FIG. 3C, the clamp arm 96 can be elongated and extended further away from the downward flange 30. As a result, the second clamping surface is at a distal end of the clamp arm 96, and is designated at reference numeral 98'. In the clamped position of FIG. 3C, the second clamping surface 98' advantageously contacts undersurface 32' of the ledge 32 instead of the downward flange 30. As a result, clamping force that may damage or distort the downward flange 30 is reduced or eliminated. To further reduce the possibility of any damage or distortion to the downward flange 30, the second clamping surface 98' may include a flexible member as illustrated, such as a polymeric member, attached to the clamp body 90 in any suitable manner.

Figure 4:
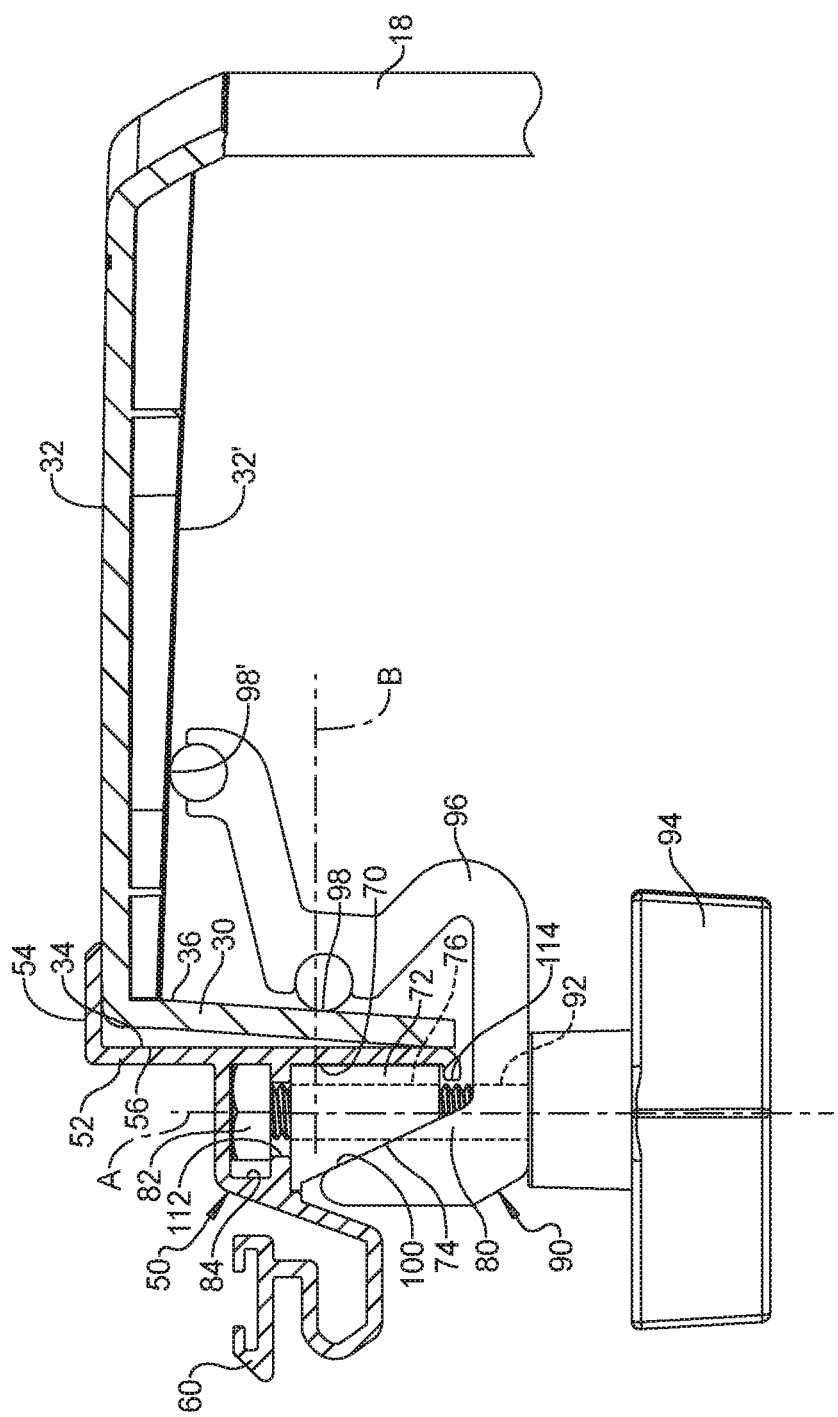
FIG. 4 illustrates yet another side rail according to the present teachings, the side rail positioned against the downward flange and the clamp body arranged in a clamped position.

With reference to FIG. 4, the clamp body 90 may include both the second clamping surface 98 and the second clamping surface 98' (when both the second clamping surfaces 98 and 98' are included, the clamping surface 98' may be considered a third clamping surface). The clamp body 90 can be angled so that the third clamping surface 98' is further from the first clamping surface 56 than the second clamping surface 98 is. Thus, the second clamping surface 98 is between the first clamping surface 56 and the third clamping surface 98'. Movement of the clamp body 98 along the rod axis A as the actuation member 94 is rotated draws the third clamping surface 98' to the undersurface 32' of the ledge 32 and towards the downward flange 30. Advantageously, a load is applied to the undersurface 32' of the ledge 32 by the third clamping surface 98', and a smaller side load is applied to the downward flange 30 by the second clamping surface 98, thereby reducing clamping force applied to the downward flange 30, and reducing the possibility that the downward flange 30 will be damaged or distorted. To further reduce the possibility of any damage or distortion to the downward flange 30, one or both of the clamping surfaces 98 and 98' may include a flexible member as illustrated, such as a polymeric member, attached to the clamp body 90 in any suitable manner. Although FIG. 4 illustrates the clamp body 90 with the first clamping surface 56, the second clamping surface 98, and the third clamping surface 98' coupled to the rod 80 extending through ramp body 72, the rod 80 may be arranged as illustrated in FIGS. 3A, 3B, or 3C, or in any other suitable manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover system for a cargo box of a pickup truck, the cargo box comprising a side wall including a downward flange having a first side facing the cargo box and a second side opposite to the first side, the tonneau cover system comprising:
   a tonneau cover sized and shaped for covering the cargo box;
   a side rail mountable to the side wall to support the cover, the side rail comprising a first clamping surface adapted to engage the first side of the side wall;
   a ramp surface opposite the first clamping surface of the side rail;
   a rod having a rod axis and mounted on the side rail; and
   a clamp body mounted on the rod and including a clamp arm having a second clamping surface;
   wherein movement of the clamp body along rod axis and towards the side rail advances the contact along the ramp surface to thereby move the second clamping surface towards the downward flange.

2. The tonneau cover system of claim 1, wherein the second clamping surface is adapted to engage the second side of the side rail.

3. The tonneau cover system of claim 1, wherein the second clamping surface is adapted to engage an undersurface of a ledge of the cargo box sidewall.

4. The tonneau cover system of claim 1, wherein: the second clamping surface is adapted to engage the second side of the side rail; the clamp arm further includes a third clamping surface adapted to engage an undersurface of a ledge of the cargo box sidewall; and movement of the clamp body along the axis of the rod advances a cam follower along the cam to thereby move the third clamping surface toward the undersurface of the ledge of the cargo box sidewall.

5. The tonneau cover system of claim 1, wherein the ramp surface is a cam, and the contact is a cam follower.

6. The tonneau cover system of claim 1, wherein the ramp surface is part of the side rail.

7. The tonneau cover system of claim 1, wherein the side rail comprises a channel opposite the first clamping surface, said tonneau cover system further comprising a ramp body disposed within the channel, and wherein the ramp surface is included with the ramp body.

* * * * *